United States Patent [11] 3,577,095

| [72] | Inventor | Richard C. Benner |
| | | Palos Verdes Estates, Calif. |
| [21] | Appl. No. | 606,521 |
| [22] | Filed | Dec. 28, 1966 |
| [45] | Patented | May 4, 1971 |
| [73] | Assignee | Hughes Aircraft Company |
| | | Culver City, Calif. |

[54] SEMIELLIPTICAL PUMP CAVITY
5 Claims, 3 Drawing Figs.
[52] U.S. Cl. .................................................. 331/94.5
[51] Int. Cl. ...................................................... H01s 3/00
[50] Field of Search ........................................... 331/94.5

[56] References Cited
UNITED STATES PATENTS
3,210,688 10/1965 Simpson ....................... 331/94.5
3,393,374 7/1968 Krumboltz .................... 331/94.5
3,413,567 11/1968 Hannwacker et al. ........ 331/94.5

Primary Examiner—Ronald L. Wibert
Assistant Examiner—Paul K. Godwin, Jr.
Attorneys—James K. Haskell and Earnest F. Oberheim ABSTRACT: Cavity structure having a first section with a highly specularly reflective semielliptical inner surface and a second section of relatively high thermal conducting material enclosing the semielliptical inner surface along its longitudinal dimension. The second section has a relatively flat inner surface in which two longitudinal grooves are disposed, one for carrying a laser rod and the other carrying an elongated pump lamp. The second section also has a rod-clamping portion as part of the sidewall of the laser-rod-holding groove, the clamping portion extending above the second section's flat inner surface for holding the laser rod in both mechanical and thermally conducting contact with the second section.

PATENTED MAY 4 1971    3,577,095

INVENTOR.
RICHARD C. BENNER,
BY J. K. Haskell
ATTORNEY.

"SEMIELLIPTICAL PUMP CAVITY

In certain of its aspects, this invention relates to a copending application of Raymond H. Griest, Ser. No. 545,438, filed Apr. 26, 1966, entitled "Laser Employing Semi-Elliptical Pump Cavity," and assigned to the assignee of this invention. This copending application describes a pump cavity structure for focusing optical frequency pump energy radiation from a linear pumping lamp at a solid-state active laser rod.

In order to produce laser action in an active laser element, a certain minimum pump energy must be supplied per unit volume of the solid laseable material and it must be supplied above a minimum rate sufficient to overcome spontaneous decay. However, the energy absorbed in the solid material is only a small fraction of the radiative output of the pump generator, such as a xenon gas lamp. This is due to the fact that a certain amount of the pump energy will not reach the solid laseable material because not all of this energy can be directed into the material and, of that amount which does, only radiative energy in the proper absorption region for the particular material used is effective in providing the excitation necessary for laser action. The energy not utilized in excitation of the laseable material takes the form of heat which, if not directed away from the material, will cause the laser action to deteriorate and to eventually cease. This heat barrier of the active laser element has been fully discussed in connection with ruby in an article entitled "Effects of Elevated Temperatures on the Fluorescence and Optical Maser Action of Ruby" by James P. Wittke, published in the Journal of Applied Physics, Vol. 33, No. 7, July 1962, and is applicable to other laseable material.

In the area of Q-switching lasers, such as used in laser range finders, for example, it has been found vital for efficient laser operation to regulate the temperature of a ruby laser element, for example, to the range of about 30° C. ±10° C. for optimum energy output and fast repetitive firing rate. At lower temperatures the control of laser pulses becomes difficult and at elevated temperatures the intensity of the emitted beam falls off considerably and eventually, as noted above, laser action will cease.

In attempting to overcome this problem, scientists have utilized various techniques such as forced air and liquid cooling. However, it has been found that in the case of air cooling, for example, it is an extremely inefficient coolant and there is a tendency for the polished interior of the pump cavity surrounding the pump lamp and the laseable material to tarnish and thus become less efficient in directing the pump energy to the active laser element. Furthermore, for airborne laser systems this method is cumbersome and inefficient since the air must be supplied by some kind of mechanical refrigeration equipment. Small mechanical refrigerators are expensive, have limited life, tend to be heavy, and occupy excessive space. The air supplied by such a cooling system must be conducted through flexible tubing and pressure drops and thermal losses along the way must be contended with. Also, a prime difficulty with the air system is the problem of regulating the temperature from the cooling to the heating mode. In the case of a liquid coolant, generally the liquid is forced (by means of a heavy and bulky pump) to circulate through glass jackets placed in the pump cavity. The jackets caused blocking of the pump light and deteriorated the focusing properties of the pumping geometry through optical distortion. In addition, this imposed some limitations on the choice of the cavity dimensions, thus limiting the flexibility of the design.

Another approach in an attempt to solve this problem has been in the design of the laser pump cavity configuration under the theory that if a substantial portion of the optical pump energy can be directed or focused on the active laser element in the form of a rod, less pump energy will be wasted in directly heating the pump cavity. One example of this is the use of an elliptical pump cavity configuration wherein the pump lamp lies along one of the focal lines of the elliptical cylinder and the active laser element in the form of a rod lies along the other focal line. This configuration provides good focusing characteristics but results in a large air space between the laser rod and the cavity inner wall. When this laser is operated at a high repetition rate, the laser element becomes extremely hot and soon stops lasing since there is a very poor thermal path to conduct the heat away from the laser rod.

Another example of this approach was the placing of the pump flash lamp and the ruby rod in close proximity to each other, surrounded by such materials as aluminum foil or magnesium oxide. This arrangement is called "close coupling." The efficiency was found to be fairly good, but not as efficient as the elliptical cavity. Also, this technique did not supply an adequate heat sink and resulted in high heat buildup in the laser rod.

A solution is provided in a laser pump structure that incorporates a semielliptical pump cavity that, according to the invention, focuses pump energy from a linear pumping lamp on a laser rod that is clamped in low impedance thermal contact with a heat sink. In addition, the rod clamp provides a powerful clamp and positive, repeatable boresight alignment of the laser rod without the necessity of observing extremely close tolerances and ultrafine machining techniques to match the rod to the cavity structure.

This technique allows normal fabrication tolerances to be used in machining and finishing the cavity and applies uniform clamping pressure so that crystal distortion is eliminated. It also maximizes the laser rod area in contact with the metal of the cavity which is highly polished and not in the shadow of extraneous pressure clamps. Extremely high forces are applied to the laser rod by the external pressure exerted on the cavity. This acts to coin or deform the metal of the cavity to exact conformity to the cylindrical surface of the laser rod and, hence, produces a superior thermal interface, a very effective mechanical attachment, and a superior optical surface for efficient laser pumping. The high pumping efficiency of the pump cavity of the invention is attained in part through the utilization of the highly specularly reflective surface of the semielliptical pump cavity that defines two parallel focal lines in a plane including the major axis of the semielliptical configuration.

The invention and specific embodiments thereof, will be described hereinafter by way of example and with reference to the accompanying drawing wherein like reference numerals refer to like elements or parts, and in which.

Figure 1:
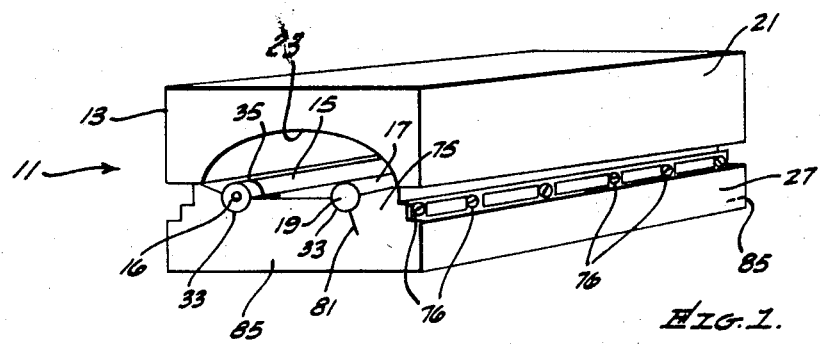
FIG. 1 is a perspective view of a laser pump cavity constructed according to the invention.

With reference now to the drawing and more particularly to FIG. 1, there is shown a laser 11 employing a pump cavity structure 13 of aluminum alloy, for example, for focusing optical frequency pump energy radiation from a conventional linear pumping lamp 15 (which may be connected by electrodes 16 to an appropriate source of energy) at a solid-state active laser rod 17, for example, pink ruby. For laser regeneration within the laser rod 17, reflectors or silvered mirrors 19 (only one shown) are provided, in this case attached or plated to the ends of the rod 17. However, detached reflectors may also be utilized if desired. In order to provide an output from the device, at least one of the mirrors 19 should be partially transmissive at the frequency of the laser beam output as generated within the laser rod 17. As an alternative to this scheme (but not shown), in the case where at least one of the two reflectors are detached from the end of the active laser rod 17, some type of beam-diverting member may be interposed between a detached reflector and the adjacent end of the laser rod that is adapted to divert a portion of the generated laser energy along a line that is not parallel to the path of the regenerative energy.

Figure 2:
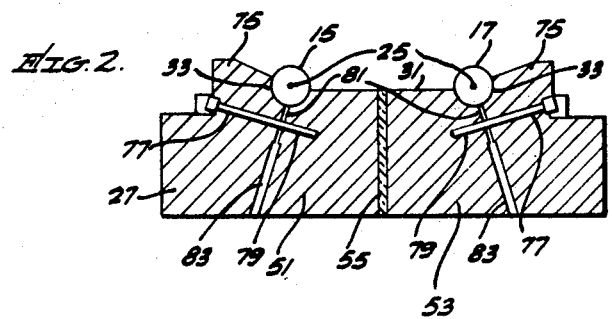
FIG. 2 is a sectional-type view of another embodiment of the invention wherein mutually insulative heat sink portions are provided.

For efficient pumping of the laser rod 17 by the pumping lamp 15, the pump cavity structure 13 is provided with a first pump cavity body section 21 having a longitudinal and highly specularly reflective (polished for example) semielliptical surface 23, which surface defines two parallel focal lines as indicated for purposes of description as points 25 in FIG. 2. These lines lie in a plane including the major axis (not shown) of the semielliptical surface 23.

To provide good thermal control of the laser rod 17 and the pumping lamp 15, the pump cavity structure 13 also is provided with a second pump cavity body section 27 having relatively high thermal conducting characteristics, such as provided by an aluminum alloy for example, disposed adjacent the first body section 21 to enclose the semielliptical surface 23 along the extremities thereof parallel to its longitudinal dimension. The second body section 27 has an inner surface 31 adapted to receive in thermal contact both the pumping lamp 15 and the laser rod 17 in positions each substantially coaxial with respective ones of the focal lines as indicated by points 25.

Figure 3:
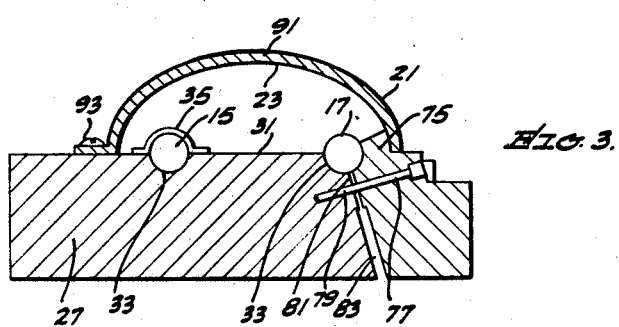
FIG. 3 illustrates a cross section of still another pump cavity constructed according to the invention.

According to the embodiments of FIGS. 1 and 3, the inner surface 31 of the second body section 27 has two parallel grooves 33 disposed symmetrically about the two focal lines. The lamp 15 may be maintained in thermal contact with the surface 31 and particularly the groove portion 33 thereof by any convenient means such as tiedown wires 35 that may be spot welded or otherwise attached to the second body section 27.

According to the invention, a deformable clamping portion 75 of the second body section 27 is adapted to clamp a laser rod, such as rod 17 between itself and the adjoining portion of the second body section 27 when appropriate machine screws 76 disposed in holes 77 are screwed into threaded portions 79. The contact on the rod 17 may be as much as 200° without appreciable loss of pumping efficiency.

The second pump cavity body section 27 may be fabricated from aluminum alloy bar stock by boring and reaming or broaching two parallel holes to the precise diameters of the laser rod and the flash lamp body. The clamping screw holes 77 are drilled and tapped and then most of the upper half of the bar stock is machined away to expose about 200° of arc of the laser rod groove and produce the surface 31 which approximates the major axis of the ellipse and forms a semielliptical cavity when the first pump cavity body section 21 is jointed thereto.

If the flash lamp is to be clamped by the body section 27 (FIG. 2) and not by wire straps 35 or by cavity end plates not shown, the machining should expose about 200° of arc of the flash lamp groove as well as about the same amount of arc for the laser rod groove. Still another alternative is to machine away less of the stock adjacent the flash lamp groove so that the opening in the surface is just less than a diameter, thereby providing the material for overcenter clamping action.

The next operation is to cut a 0.010-inch-wide slot 81, for example, which allows the portion 75 of the second body section 27 to be deformed around the laser rod 17 and subsequently clamped therearound by the clamping screws 76. A larger cut 83 is made from the bottom of the second body section 27 and parallel to the first mentioned slot but not to the ends 85 of the section 27. The laser rod 17 is clamped in the groove 33 by the clamping screws 76 seated in the holes 77 and external forces are applied to the sides of the second body section 27 to force the aluminum alloy to yield and conform to the microscopic irregularities of the laser rod surface. The external deforming forces are then removed and the clamping screws 76 are retightened to their yield stress. The resulting thermal interface has been found to be roughly an order of magnitude better than the best interface made by precision machining methods without using this coining process.

The semielliptical pump cavity configuration described provides substantially the equivalent function and advantages with regard to the focusing of pumping energy as does a conventional full elliptical cavity but in only one-half the volume.

It has been found that where a semielliptical cavity is used, which is essentially one-half of a complete elliptical cavity divided symmetrically along a plane including the major axis of the elliptical cross section, substantially all the light generated by a pumping lamp situated along one of the focal lines defined by the semielliptical surface is directed to an active laser rod disposed along the other focal line either by reflection from the curved surface or directly. In order to increase the efficiency even higher, the grooved portions in contact with the lamp and rod may be caused to be highly specularly reflective either by polishing or by the plating of an appropriate material on the surface. Thus, the grooved portions 33 of the surface 31 may be highly polished or plated with silver, for example.

In the case where a greater amount of control is desired over the temperature of operation of the lamp and the laser rod as in the case of a high-power laser and/or high repetition rate of a pulsed laser, the embodiment of the invention as illustrated in FIG. 2 may be used. Essentially, this configuration is the same as shown in FIG. 1 but the second pump cavity body section 27 is provided with two mutually insulative portions 51 and 53 separated by a thermally insulative material 55 such as air or nylon, for example. FIG. 2 also indicates that the flash lamp 15 may also be clamped to the body section 27 in a manner similar to that used to hold the laser rod 17.

Experiment has shown that since the semielliptical surface 23 of the first pump cavity body section 21 conducts relatively little heat because it is highly reflective and absorbs energy to only a very limited degree, it need not act as a heat sink and can therefore be fabricated from sheet materials such as stainless steel or sheet aluminum 91 formed to provide the semielliptical surface 23 as seen in FIG. 3. It may be convenient in this case to secure this light weight curved section to the second body section 27 by means of machine screws 93, for example.

From the foregoing, it will be evident that the invention provides an improved and highly efficient semielliptical laser pump cavity that focuses optical frequency pump energy radiation from a linear pumping lamp at a solid-state active laser rod in addition to providing for positive, repeatable boresight alignment of the laser rod.

Although specific embodiments of the invention have been described in detail, other organizations of the embodiments shown may be made within the spirit and scope of the invention. For example, the slot 83 may be cut completely through to the ends 85 of the second body section 27 to thus provide a detachable clamping strip.

It is also intended that the foregoing disclosure and drawing shall be considered only as illustrations of the principles of this invention and are not to be construed in a limiting sense.

I claim:

1. A laser pump cavity structure for focusing optical frequency pump energy radiation from a single linear pumping lamp at a solid-state active laser rod, comprising:

a first pump cavity body section having a longitudinal and highly specularly reflective semielliptical surface which defines two parallel focal lines in a plane including the major axis of said semielliptical surface; and a second pump cavity body section having relatively high thermal conducting characteristics adjacent said first body section to enclose said semielliptical surface along the extremities thereof parallel to its longitudinal dimension, said second body section having a relatively flat inner surface wherein laser-rod- and pump-lamp-carrying longitudinal grooves are disposed in a position substantially coaxial with said two focal lines, said second body section also having a rod-clamping portion as part of the sidewall of one of said grooves and extending above said relatively flat surface to enclose and hold said laser rod in thermal and mechanical contact with said second body section for over 50 percent of its peripheral surface.

2. A laser pump cavity structure for focusing optical frequency pump energy radiation from single linear pumping lamp at a solid-state active laser rod, comprising:

a first pump cavity body section having a longitudinal and highly specularly reflective semielliptical surface which defines two parallel focal lines in a plane including the major axis of said semielliptical surface; and a second pump cavity body section having relatively high thermal conducting characteristics adjacent said first body section to enclose said semielliptical surface along the extremities thereof parallel to its longitudinal dimension, said second body section having a relatively flat inner surface wherein laser rod and pump-lamp-carrying longitudinal grooves are disposed in positions each substantially coaxial with respective ones of said two focal lines, said second body section also having a rod-clamping portion and a lamp-clamping portion as part of the sidewalls of said grooves, said clamping portions extending above said surface to enclose and hold said laser rod and said lamp in thermal and mechanical contact with said second body section for over 50 percent of their peripheral surfaces.

3. A laser pump cavity structure as claimed in claim 2, wherein the surfaces of said grooves are highly specularly reflective.

4. A laser pump cavity structure as claimed in claim 1, wherein the surfaces of said grooves are highly specularly reflective.

5. A laser pump cavity structure according to claim 2, wherein said second section further comprises two major portions thermally insulated from each other, each portion carrying different ones of said grooves.